(12) United States Patent
Lee (10) Patent No.: US 11,368,516 B1
(45) Date of Patent: Jun. 21, 2022

(54) METHOD FOR UPLOADING FILE VIA CLOUD COMPUTING ENVIRONMENT, AND PROXY SERVER FOR EXECUTING THE SAME

(71) Applicant: CLOUDIKE INC., Gyeonggi-do (KR)

(72) Inventor: Sun Ung Lee, Seoul (KR)

(73) Assignee: CLOUDIKE INC., Gyeonggi-Do (KR)

( * ) Notice: Subject to any disclaimer, the term of this patent is extended or adjusted under 35 U.S.C. 154(b) by 0 days.

(21) Appl. No.: 17/472,835

(22) Filed: Sep. 13, 2021

(30) Foreign Application Priority Data

Jan. 4, 2021 (KR) .......................... 10-2021-0000182

(51) Int. Cl.
| | | |
|---|---|---|
| *G06F 15/16* | (2006.01) | |
| *H04L 67/06* | (2022.01) | |
| *H04L 67/1097* | (2022.01) | |
| *H04L 67/02* | (2022.01) | |
| *H04L 67/561* | (2022.01) | |

(52) U.S. Cl.
CPC .............. *H04L 67/06* (2013.01); *H04L 67/02* (2013.01); *H04L 67/1097* (2013.01); *H04L 67/561* (2022.05)

(58) Field of Classification Search
CPC ..... H04L 67/06; H04L 67/02; H04L 67/1097; H04L 67/2804
USPC .......................... 709/203, 217, 218, 223, 226
See application file for complete search history.

(56) References Cited

U.S. PATENT DOCUMENTS

| | | | | |
|---|---|---|---|---|
| 2014/0136733 A1* | 5/2014 | Dunsmuir | .......... | H04N 21/8547 709/248 |
| 2014/0162234 A1* | 6/2014 | Ukelson | .................... | G09B 7/02 434/308 |
| 2016/0036932 A1* | 2/2016 | Evdokimov | ............ | H04L 67/18 709/224 |
| 2021/0105371 A1* | 4/2021 | Diasti | ................ | H04N 1/00403 |

FOREIGN PATENT DOCUMENTS

| | | |
|---|---|---|
| KR | 10-2009-0097165 A | 9/2009 |
| KR | 10-2015-0047684 A | 5/2015 |
| KR | 10-2016-0024037 A | 3/2016 |
| KR | 10-2017-0028621 A | 3/2017 |

OTHER PUBLICATIONS

Office action dated Feb. 17, 2021 from Korean Patent Office in a counterpart Korean Patent Application No. 10-2021-0000182 (all the cited references are listed in this IDS.) (English translation is also submitted herewith.).

* cited by examiner

*Primary Examiner* — Liang Che A Wang
(74) *Attorney, Agent, or Firm* — The PL Law Group, PLLC

(57) ABSTRACT

A proxy server for uploading a file according to an embodiment of the present disclosure improves the upload speed of a file and to minimize upload delay due to the occurrence of an error in the upload process. Due to the fact that the upload of the upload target file is started by the client delivering only one HTTP request to the proxy server to start the upload of the upload target file instead of requesting an upload link for each divided chunk to the backend server and receiving the response message from the backend server, a transaction over a network having a relatively slow communication speed can be minimized and the upload speed can be improved accordingly.

6 Claims, 6 Drawing Sheets

METHOD FOR UPLOADING FILE VIA CLOUD COMPUTING ENVIRONMENT, AND PROXY SERVER FOR EXECUTING THE SAME

CROSS-REFERENCE TO RELATED APPLICATION

This application claims the benefit under 35 USC § 119(a) of Korean Patent Application No. 10-2021-0000182, filed on Jan. 4, 2021, in the Korean Intellectual Property Office, the entire disclosure of which is incorporated herein by reference for all purposes.

BACKGROUND

1. Field

Exemplary embodiments of the present invention relate to a file upload technique.

2. Description of Related Art

As network technology develops, data stored in a terminal (e.g., desktop, laptop, portable device, etc.) used by a user can be stored in a cloud storage and the user can use the data stored in the cloud storage anytime, anywhere by using his or her account whenever necessary. The user can upload or download files through the cloud storage, and check a modified file in real time through file sharing and synchronization.

However, there is a problem that in order to upload one file in such a cloud service, a large amount of requests should be generated, in particular, as the size of the file intended to be uploaded increases, the number of chunks to be distributed and stored in the cloud storage increases, and thus the number of requests for file upload increases. Accordingly, it may take a lot of time for the user to upload one file such as a photo, which leads to deterioration of cloud service quality.

SUMMARY

Embodiments of the present invention are intended to improve the upload speed of a file through a proxy server and to minimize upload delay due to occurrence of an error in an upload process.

According to an exemplary embodiment, there is provided a proxy server that is connected to a client over a network and is respectively connected to a cloud storage, a backend server, and a cloud worker via a cloud computing environment having a faster communication speed than the network, the proxy server including a file receiving unit that receives an upload request message including an upload target file from the client, a file processing unit that divides the upload target file into a plurality of chunks, generates an upload link for each of the plurality of divided chunks, and uploads each of the plurality of chunks to the cloud storage according to the upload link, a metadata extraction unit that extracts metadata of the upload target file, and an upload completion processing unit that delivers an upload completion message including the upload link for each of the plurality of chunks and the metadata to the cloud worker through the backend server so that the cloud worker performs post-processing of the upload target file, and transmits a response message to the upload request message to the client upon receiving a confirmation message for the upload completion message from the backend server.

The file processing unit may simultaneously upload each of the plurality of chunks to the cloud storage according to the upload link, and when an error occurs during an upload process for each of the plurality of chunks, may re-upload only the chunk in which the has occurred.

The post-processing of the upload target file may be performed by obtaining the upload target file from the cloud storage using the upload link and the metadata by the cloud worker.

The post-processing of the upload target file may include one or more of generating an icon for the upload target file, generating a preview of the upload target file, generating a thumbnail for the upload target file, transcoding of the upload target file, and face recognition included in the upload target file.

The file receiving unit, after the response message to the upload request message is transmitted to the client, may receive an upload request message for a new file from the client without having to wait until the post-processing of the upload target file is completed.

According to another exemplary embodiment, there is provided a method for uploading a file performed by a proxy server that is connected to a client over a network and is respectively connected to a cloud storage, a backend server, and a cloud worker via a cloud computing environment having a faster communication speed than the network, the method including receiving, by a file receiving unit, an upload request message including an upload target file from the client, dividing, by a file processing unit, the upload target file into a plurality of chunks, generating, by the file processing unit, an upload link for each of the plurality of divided chunks, uploading, by the file processing unit, each of the plurality of chunks to the cloud storage according to the upload link, extracting, by a metadata extraction unit, metadata of the upload target file, delivering, by an upload completion processing unit, an upload completion message including the upload link for each of the plurality of chunks and the metadata to the cloud worker through the backend server so that the cloud worker performs post-processing of the upload target file, and transmitting, by the upload completion processing unit, a response message to the upload request message to the client upon receiving a confirmation message for the upload completion message from the backend server.

In the uploading each of the plurality of chunks to the cloud storage, each of the plurality of chunks may be simultaneously uploaded to the cloud storage according to the upload link, and when an error occurs during an uploading process for each of the plurality of chunks, only the chunk in which the error has occurred may be uploaded.

The post-processing of the upload target file may be performed by obtaining the upload target file from the cloud storage using the upload link and the metadata by the cloud worker.

The post-processing of the upload target file may include one or more of generating an icon for the upload target file, generating a preview of the upload target file, generating a thumbnail for the upload target file, transcoding of the upload target file, and face recognition included in the upload target file.

In the method for uploading the file, after the transmitting the response message to the upload request message to the client, an upload request message for a new file may be received from the client by the file receiving unit without having to wait until the post-processing of the upload target file is completed.

According to embodiments of the present invention, due to the fact that the upload of the upload target file is started by the client delivering only one HTTP request to the proxy server to start the upload of the upload target file instead of requesting an upload link for each divided chunk to the backend server and receiving the response message from the backend server, a transaction over a network having a relatively slow communication speed can be minimized and the upload speed can be improved accordingly.

According to an embodiment of the present invention, by the proxy server simultaneously uploading each chunk of the upload target file to the cloud storage via the cloud computing environment, the upload speed can be significantly improved compared to when the client uploads each chunk to the cloud storage over a network such as the Internet, Wi-Fi network, etc.

In addition, according to an embodiment of the present invention, the proxy server divides the upload target file into a plurality of chunks and directly generates an upload link for each divided chunk, and thus even if an error occurs during the upload process, upload delay due to an error caused by a network interruption can be minimized by re-uploading only the chunk in which the has occurred.

Furthermore, according to an embodiment of the present invention, the metadata of the upload target file is extracted by the proxy server and delivered to the cloud worker through the backend server, and thus the client can receive a response message to the upload request message from the proxy server more quickly after the metadata is extracted and accordingly, can request an upload of a new file to the proxy server without having to wait until the post-processing of the upload target file is completed.

DETAILED DESCRIPTION

Hereinafter, specific embodiments of the present invention will be described with reference to the drawings. The following detailed description is provided to aid in a comprehensive understanding of the method, apparatus, and/or system described in this specification. However, this is only an example and the present invention is not limited thereto.

Figure 1:
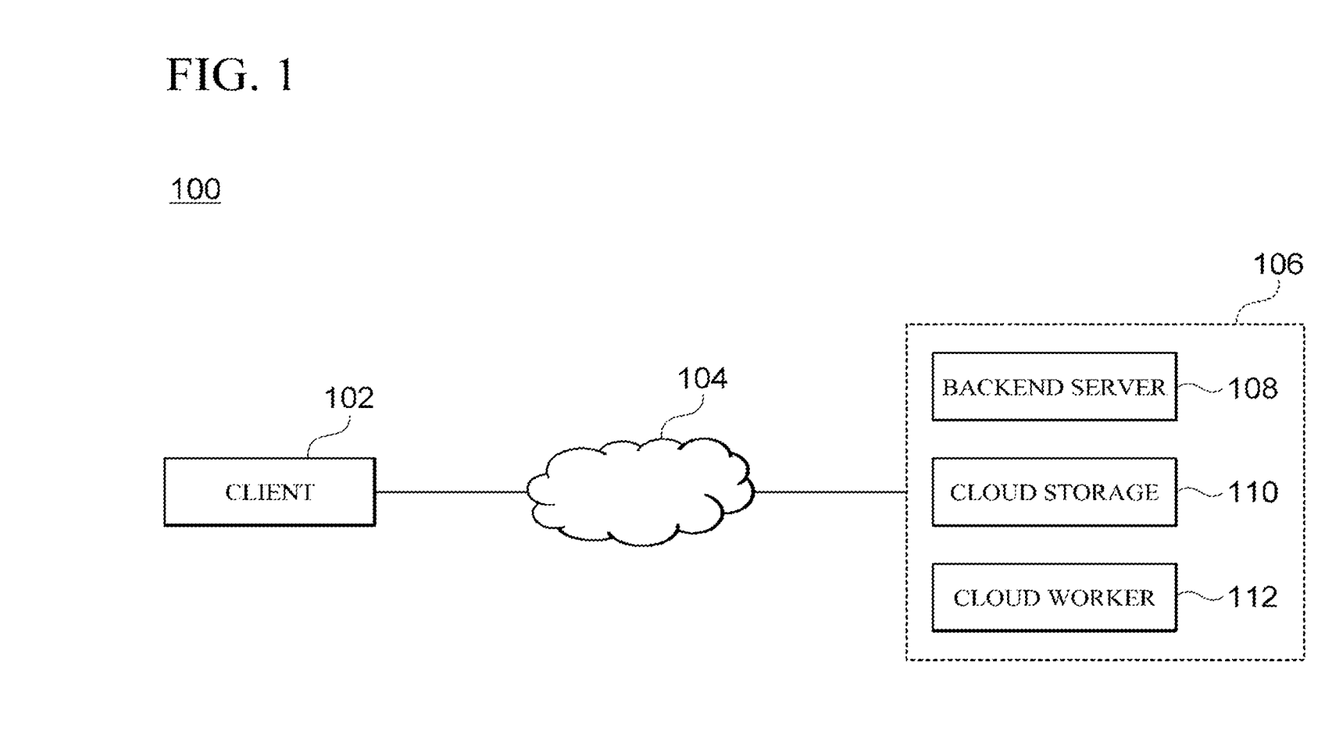
FIG. 1 is a block diagram illustrating a detailed configuration of a file upload system according to a first embodiment of the present invention.

In describing the embodiments of the present invention, when it is determined that a detailed description of related known technologies may unnecessarily obscure the subject matter of the disclosed embodiments, a detailed description thereof will be omitted. In addition, terms to be described later are terms defined in consideration of functions in the disclosed embodiments of the present invention, which may vary according to the intention or custom of users or operators. Therefore, the definition thereof should be made based on the contents throughout this specification. The terms used in the detailed description are only for describing the embodiments, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, parts or combinations thereof, other than those described FIG. 1 is a block diagram illustrating a detailed configuration of a file upload system 100 according to a first embodiment of the present invention. As illustrated in FIG. 1, the file upload system 100 according to the first embodiment of the present invention includes a client 102, a backend server 108, a cloud storage 110, and a cloud worker 112.

The client 102 is a terminal possessed by the user, and may be, for example, a desktop, a laptop computer, a tablet computer, a smart phone, a PDA, or a wearable device such as a smart watch. The client 102 may generate a file upload request according to a user's command. Hereinafter, a file requested to be uploaded by the client 102 will be referred to as an upload target file. The upload target file may include, for example, a picture, an image, a video, a document file, etc., but the upload target file is not limited to a specific type of file.

The client 102 may connect to the backend server 108 and the cloud storage 110 in a cloud computing environment 106 over a network 104. Here, the network 104 may include a mobile network such as the Internet, a Wi-Fi network, a 3G network, an LTE network, a wide area network, etc.

The client 102 may generate an upload request message for the upload target file and transmit the upload request message to the backend server 108. The client 102 may divide the upload target file into a plurality of chunks upon receiving a response message to the upload request message from the backend server 108, and sequentially request an upload link for each of the divided chunks from the backend server 108. Specifically, the client 102 may request an upload link for #1st chunk among the plurality of divided chunks to the backend server 108, and the client 102 may upload #1st chunk to the cloud storage 110 by using the upload link upon receiving the upload link for #1st chunk from the backend server 108. Thereafter, the client 102 may request an upload link for #2nd chunk among the plurality of divided chunks to the backend server 108, and the client 102 may upload #2nd chunk to the cloud storage 110 by using the upload link upon receiving the load link for #2nd chunk from the backend server 108. As such, the client 102 may request the upload link for #Nth chunk to the backend server 108, receive the upload link for #Nth chunk from the backend server 108, and upload #Nth chunk to the cloud storage 110 according to the upload link for #Nth chunk. That is, the client 102 may sequentially perform request/ reception of the upload link and upload to the cloud storage for each of #1st, #2nd, . . . #Nth chunk.

The client 102 may request the backend server 108 to confirm upload completion for the upload target file when the upload of each of the #1st to #Nth chunks of the upload target file is completed, and as a response to this, may receive a task ID for post-processing of the upload target file from the backend server 108. As will be described later, the post-processing for the upload target file may be performed by the cloud worker 112, and the client 102 may request the backend server 108 to confirm completion of the post-processing through the task ID. The client 102 may receive a completion message indicating that the post-processing is completed from the backend server 108, and may request the backend server 108 to upload a new file only after receiving the post-processing completion message.

The backend server 108 is a device that performs database (DB) management, user authentication, etc. including log recording/management of data in providing cloud services, and may exist in the cloud computing environment 106. As described above, the backend server 108 may receive the upload request message including the upload target file from the client 102 and transmit a response message thereto to the client 102. In addition, the backend server 108 may receive a request from the client 102 for an upload link for the #Nth chunk of the upload target file, generate an upload link for the #Nth chunk, and transmit the upload link to the client 102. In this case, the back-end server 108 may sequentially generate and transmit the upload link for each of the #1st, #2nd, . . . #Nth chunks of the upload target file.

In addition, the backend server 108 may receive an upload completion confirmation request for the upload target file from the client 102, and may request a task for post-processing of the upload target file to the client work 112. In addition, the backend server 108 may transmit the task ID for post-processing of the upload target file to the client 102.

The cloud storage 110 is a storage in which the upload target file is stored, and may exist in the cloud computing environment 106. As described above, the client 102 may sequentially upload each of the #1st to #Nth chunks of the upload target file to the cloud storage 110 according to the upload link received from the backend server 108.

The cloud worker 112 is a module that performs post-processing of the upload target file, and may exist in the cloud computing environment 106. The cloud worker 112 may obtain the upload target file by accessing the cloud storage 110 upon receiving the post-processing request of the upload target file from the backend server 108. Thereafter, the cloud worker 112 may perform various post-processing such as generating an icon for the upload target file, generating a preview for the upload target file, generating a thumbnail for the upload target file, generating an icon for the upload target file, transcoding, face recognition included in the upload target file, etc. In addition, the cloud worker 112 may upload the icon, the preview, etc. generated through the post-processing to the cloud storage 110.

Figure 2:
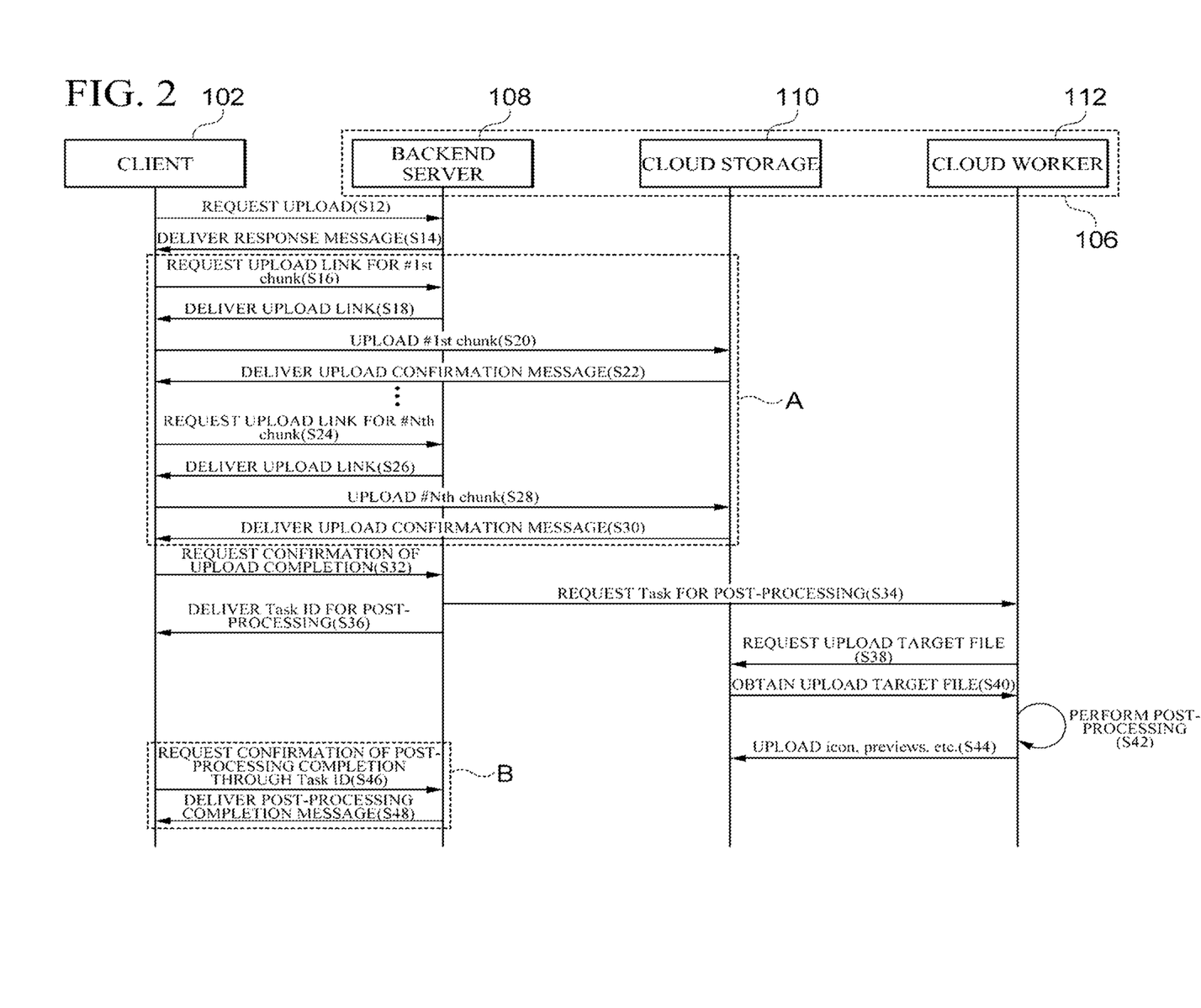
FIG. 2 is a flowchart illustrating a method for uploading a file according to the first embodiment of the present invention.

FIG. 2 is a flowchart illustrating a method for uploading a file according to the first embodiment of the present invention.

First, the client 102 generates an upload request message for the upload target file and transmits the upload request message to the backend server 108 (S12).

Next, the backend server 108 transmits a response message to the upload request message to the client 102 (S14).

Next, the client 102 divides the upload target file into a plurality of chunks, and requests an upload link for the #1st chunk among the plurality of divided chunks to the backend server 108 (S16).

Next, the client 102 receives the upload link for the #1st chunk from the backend server 108 (S18).

Next, the client 102 uploads the #1st chunk to the cloud storage 110 by using the upload link for the #1st chunk (S20).

Next, the client 102 receives the upload confirmation message for the #1st chunk from the cloud storage 110 (S22).

Next, the client 102 sequentially performs the upload link request and upload link reception steps for the #2nd to #Nth chunks, and the upload and upload confirmation message reception steps for the #2 to #Nth chunks (S24 to S30).

Next, the client 102 requests the backend server 108 to confirm the upload completion for the upload target file (S32).

Next, the backend server 108 requests a task for post-processing of the upload target file to the client work 112 (S34). In this case, the task request may include information on an upload link for each chunk generated by the backend server 108.

Next, the client 102 receives a task ID for post-processing of the upload target file from the backend server 108 as a response to the upload completion confirmation request for the upload target file in step S32 (S36).

Next, the cloud worker 112 requests the upload target file to the cloud storage 110 (S38). The cloud worker 112 may request the upload target file to the cloud storage 110 with reference to the upload link for each chunk included in the task request received in step S34.

Next, the cloud worker 112 obtains the upload target file from the cloud storage 110 (S40).

Next, the cloud worker 112 performs post-processing on the upload target file (S42). In this case, the cloud worker 112 may extract metadata for the upload target file from the upload target file and perform post-processing on the upload target file using the metadata. The post-processing may include, for example, generating an icon for the upload target file, generating a preview of the upload target file, generating a thumbnail for the upload target file, transcoding of the upload target file, face recognition included in the upload target file, etc.

Next, the cloud worker 112 uploads the icon, preview, etc. generated through the post-processing to the cloud storage 110 (S44).

Next, the client 102 requests the backend server 108 to confirm completion of the post-processing through the task ID received in step S36 (S46).

Finally, the client 102 receives a completion message indicating that the post-processing is completed from the backend server 108 (S48).

As described above, in the method for uploading the file according to the first embodiment of the present invention, the backend server 108 processes the upload request of the client 102 to support file upload to the cloud storage 110. However, the method for uploading the file according to the first embodiment of the present invention has several problems.

First, referring to A of FIG. 2, the client 102 should divide the upload target file into a plurality of chunks in order to upload the upload target file to the cloud storage 110 and then request an upload link for each divided chunk to the backend server 108 one by one. That is, the client 102 may perform the upload for each chunk only after requesting the upload link for each divided chunk to the backend server 108 and receiving the upload link therefrom. Accordingly, as the number of chunks for the upload target file increases, the number of transactions according to the request/reception of the upload link increases, which in turn causes an increase in the load of the backend server 108 and a decrease in the upload speed. In particular, since the network for transmitting and receiving files between the client 102 and the backend server 108 has a slow communication speed compared to the cloud computing environment 106, the file upload speed significantly decreases as the number of chunks increases.

Second, referring to A of FIG. 2, the client 102 sequentially performs request/reception of the upload link and upload to the cloud storage for each of #1st, #2nd, . . . #Nth chunk of the upload target file. According to this sequential upload method, when an error occurs during the upload process for each of the plurality of chunks, it is necessary to re-upload not only the chunk in which the error has occurred but also the chunk uploaded before the chunk in which the error has occurred. That is, according to the method for uploading the file according to the first embodiment of the present invention, when an error occurs in the upload process, there is an inconvenience of having to re-upload the entire upload target file when an error occurs in the upload process.

Third, referring to B of FIG. 2, the client 102 may start uploading a new file only after step S48 is completed. That is, even if the upload target file is uploaded to the cloud storage 110 after the client 102 requests to upload the upload target file through step S12, the cloud worker 112 cannot perform various post-processing tasks, including a synchronization task for the upload target file, a location identification of the upload target file, etc. before obtaining the upload target file from the cloud storage 110 and extracting the metadata for the upload target file, and thus the client 102 should wait until the cloud worker 112 extracts the metadata for the upload target file. Accordingly, the client 102 may start an upload for the new file only after the extraction of the metadata for the upload target file is completed by the cloud worker 112 and the post-processing completion message is received from the backend server 108 through step S48. For this reason, uploading of a new file is delayed, and the more the upload target files, the longer the overall upload time.

As such, the method for uploading the file according to the first embodiment of the present invention has several problems, and in order to solve these problems, the method for uploading the file according to the first embodiment of the present invention has been improved. The improved method for uploading the file will be described in detail with reference to FIGS. 3 to 5.

Figure 3:
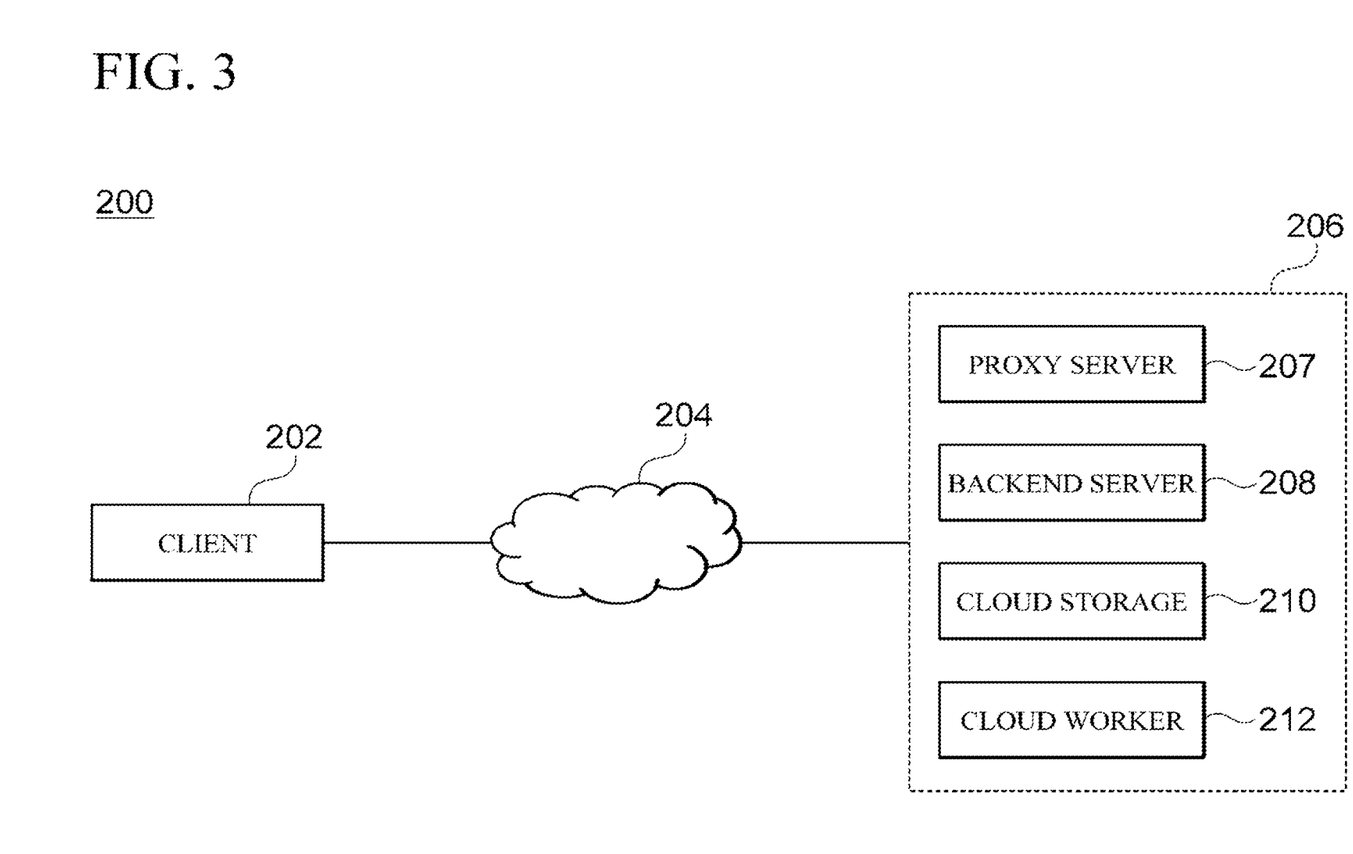
FIG. 3 is a block diagram illustrating a detailed configuration of a file upload system according to a second embodiment of the present invention.

FIG. 3 is a block diagram illustrating a detailed configuration of a file upload system 200 according to a second embodiment of the present invention. The file upload system 200 according to the second embodiment of the present invention illustrated in FIG. 3 is an improvement of the file upload system 100 according to the first embodiment of the present invention described above. Hereinafter, the file upload system 200 according to the second embodiment of the present invention will be described with a focus on the configuration and functions other than the parts overlapping those described in FIG. 1.

As illustrated in FIG. 3, the file upload system 200 according to the second embodiment of the present invention includes a client 202, a proxy server 207, a backend server 208, a cloud storage 210, and a cloud worker (212).

The client 202 is a terminal possessed by the user, and may be, for example, a desktop, a notebook computer, a tablet computer, a smart phone, a PDA, a wearable device such as a smart watch, etc. The client 202 may generate an upload request for an upload target file according to a user's command.

The client 202 may access the proxy server 207 in the cloud computing environment 106 over a network 204 to request an upload of the upload target file. Here, the network 104 may include a mobile network such as the Internet, a Wi-Fi network, a 3G network, an LTE network, wide area networks, etc.

The client 202 may generate an upload request message and transmit the upload request message to the proxy server 207. In this case, the client 202 transmits only an upload request message to the proxy server 207 instead of requesting an upload link for each chunk of the upload target file to the backend server 208. In addition, the upload request message includes the upload target file, and accordingly, the client 202 does not transmit the upload target file to the cloud storage 210. That is, the client 202 transmits only the upload request message including the upload target file to the proxy server 207, and then confirms the upload completion by receiving a response message to the upload request message from the proxy server 207.

The proxy server 207 is a device that receives data related to a file upload request from the client 202 and relays the data, and may exist in the cloud computing environment 206.

The proxy server 207 receives an upload request message including the upload target file from the client 202. Accordingly, the proxy server 207 may divide the upload target file into a plurality of chunks, generate an upload link for each of the plurality of divided chunks, and upload each of the plurality of chunks to the cloud storage 210 according to the upload link. In this case, the proxy server 207 may simultaneously upload each of the plurality of chunks to the cloud storage 210 according to the upload link. If an error occurs during the upload process for each of the plurality of chunks, the proxy server 207 may re-upload only the chunk in which the error has occurred instead of re-uploading each of the plurality of chunks.

That is, according to the second embodiment of the present invention, instead of the client 202 requesting an upload link for each divided chunk to the backend server 208 one by one after dividing the upload target file into a plurality of chunks, the proxy server 207 divides the upload target file into a plurality of chunks, generates an upload link for each divided chunk, and then uploads each chunk to the cloud storage 210 at once. In this case, the step of requesting and receiving the upload link for each divided chunk is omitted compared to the first embodiment described above, and thus the upload speed can be significantly improved. In addition, the proxy server 207 and the cloud storage 210 exist in the same cloud computing environment 206, and thus the upload speed is much faster when the cloud storage 210 uploads each chunk to the cloud storage 210 via the cloud computing environment 206 compared to when the client 202 uploads each chunk to the cloud storage 210 via the network 204 such as the Internet, a Wi-Fi network, etc. Furthermore, the proxy server 207 divides the upload target file into a plurality of chunks and then directly generates an upload link for each divided chunk. Therefore, even if an error occurs during the upload process, upload delay due to an error caused by a network interruption can be minimized by re-uploading only the chunk in which the error has occurred.

In addition, the proxy server 207 may extract the metadata of the upload target file, and transmit an upload completion message including the upload link for each of the plurality of chunks and the metadata to the backend server 208 so that the cloud worker 212 can perform post-processing of the upload target file.

The backend server 208 is a device that performs database (DB) management, user authentication, etc. including log recording/management of data in providing cloud services, and may exist in the cloud computing environment 206. The backend server 208 may receive the upload completion message including the upload link for each of the plurality of chunks and the metadata from the proxy server 207, and request a task for post-processing the upload target file to the client worker 112. In this case, the request for the task may include the upload completion message. In addition, the backend server 208 may transmit a confirmation message for the upload completion message to the proxy server 207, and accordingly, the proxy server 207 may transmit a response message to the upload request message to the client 202.

The cloud storage 210 is a storage in which the upload target file is stored, and may exist in the cloud computing environment 206. As described above, the proxy server 207 may divide the upload target file into a plurality of chunks, generate the upload link for each divided chunk, and then upload each chunk to the cloud storage 210 at once. These file uploads take place within the same cloud computing environment 206, and thus can be performed very quickly compared to the case where the client 202 uploads each chunk to the cloud storage 210 over the network 204 such as the Internet, a Wi-Fi network, or the like.

The cloud worker 212 is a module that performs the post-processing of the upload target file, and may exist in the cloud computing environment 206. The cloud worker 212 may acquire the upload target file by accessing the cloud storage 210 upon receiving the post-processing request of the upload target file from the proxy server 207. Thereafter, the cloud worker 112 may perform various post-processing such as generating an icon for the upload target file, generating a preview of the upload target file, generating a thumbnail for the upload target file, transcoding of the upload target file, face recognition included in the upload target file, etc. In addition, the cloud worker 112 may upload the icon, the preview, etc. generated through the post-processing to the cloud storage 110.

As described above, the request of the task may include the upload link for each chunk of the upload target file and metadata of the upload target file. Accordingly, the cloud worker 212 may perform the post-processing of the upload target file faster by using the metadata. Furthermore, the metadata of the upload target file is extracted by the proxy server 207 and delivered to the cloud worker 212 through the backend server 208. Therefore, the client 202 may receive a response message to the upload request message from the proxy server 207 after the metadata is extracted, and accordingly, the client 202 may request the proxy server 207 to upload a new file without having to wait until post-processing of the upload target file is completed. That is, according to the second embodiment of the present invention, since the extraction of metadata for the upload target file is performed by the proxy server 207 rather than the cloud worker 212, upload delay for a new file can be minimized, and accordingly, the overall upload time can be shortened.

Figure 4:
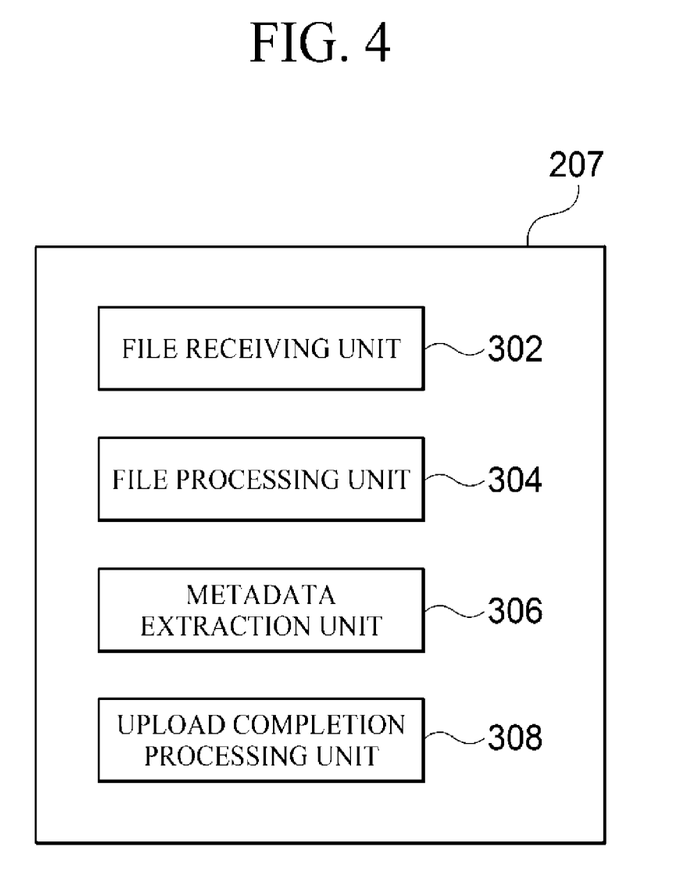
FIG. 4 is a block diagram illustrating a detailed configuration of a proxy server according to the second embodiment of the present invention.

FIG. 4 is a block diagram illustrating a detailed configuration of the proxy server 207 according to the second embodiment of the present invention. As illustrated in FIG. 4, the proxy server 207 according to the second embodiment of the present invention includes a file receiving unit 302, a file processing unit 304, a metadata extraction unit 306, and an upload completion processing unit 308.

The file receiving unit 302 receives an upload request message including an upload target file from the client 202. As will be described later, after the response message to the upload request message is transmitted to the client 202, the file receiving unit 302 may receive an upload request message for a new file from the client 202 without having to wait until post-processing of the upload target file is completed.

The file processing unit 304 may divide the upload target file into a plurality of chunks, and perform an indexing operation on each of the divided chunks. In addition, the file processing unit 304 generates an upload link for each of the divided chunks, and uploads each of the plurality of chunks to the cloud storage 210 according to the upload link. In this case, the file processing unit 304 may simultaneously upload each of the plurality of chunks to the cloud storage 210 according to the upload link. In addition, when an error occurs during the upload process for each of the plurality of chunks, the file processing unit 304 may re-upload only the chunk in which the error has occurred.

The meta data extraction unit 306 extracts metadata of the upload target file. Here, the metadata includes, for example, a file name, file type or type, file size of the upload target file, the number of the divided chunks, the generation time of the upload target file, an identification number of the client 202 that uploaded the upload target file, etc.

The upload completion processing unit 308 delivers an upload completion message including the upload link for each of the plurality of chunks and the metadata to the cloud worker 212 through the backend server 208 so that the cloud worker 212 can perform the post-processing of the upload target file. As described above, the post-processing of the upload target file may be performed by obtaining the upload target file from the cloud storage 210 using the upload link and the metadata by the cloud worker 212. The post-processing may include post-processing using only the meta data, post-processing using the upload target file, and post-processing using the metadata and the upload target file at the same time. In this way, when the metadata is extracted by the proxy server 207 in advance and delivered to the cloud worker 212, various post-processing of the upload target file described above can be performed more quickly.

In addition, the upload completion processing unit 308 may transmit a response message to the upload request message to the client 202 upon receiving a confirmation message for the upload completion message from the backend server 208. As described above, after receiving the response message to the upload request message, the client 202 may transmit the upload request message for a new file to the file receiving unit 302 to start uploading the new file.

Figure 5:
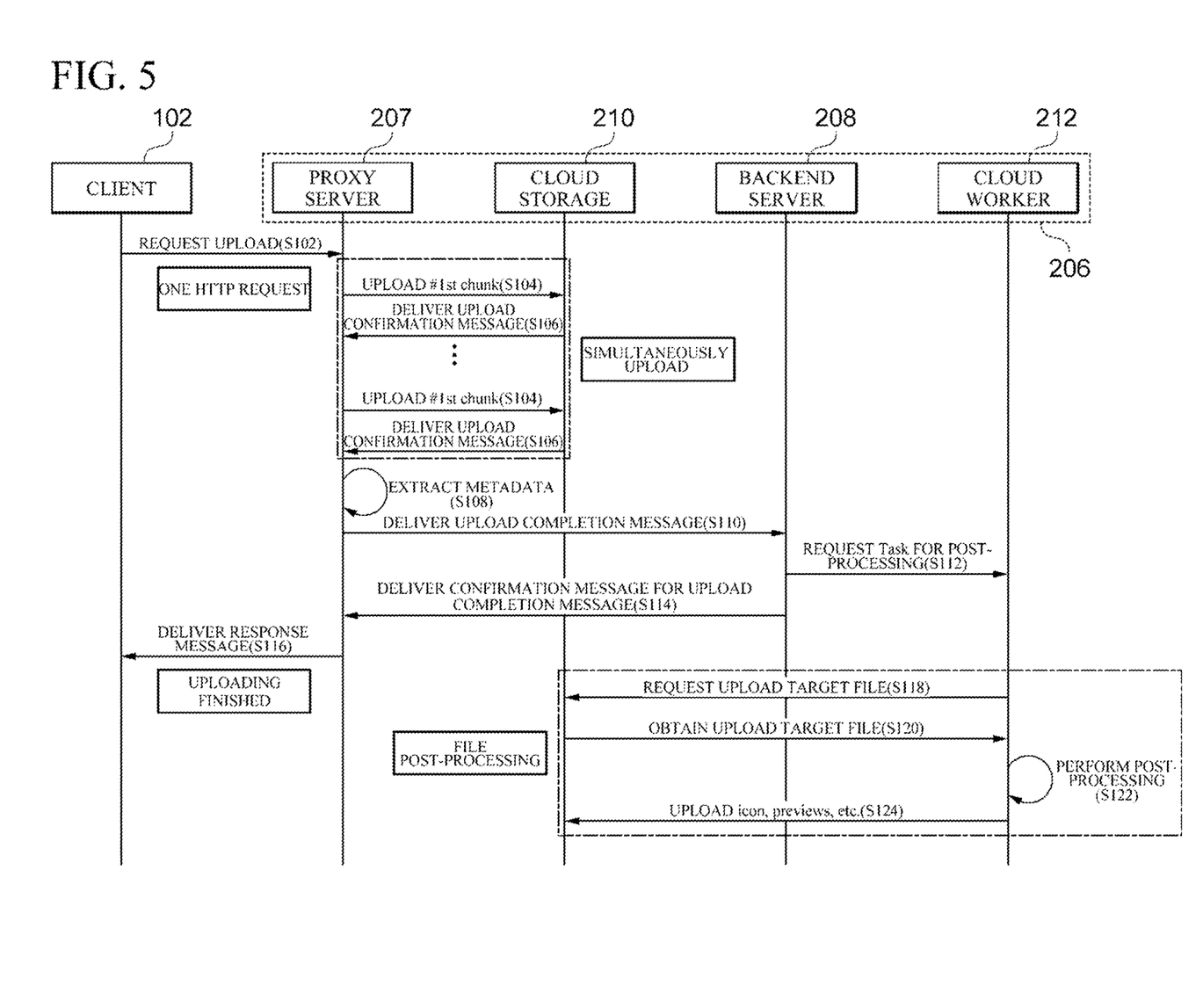
FIG. 5 is a flowchart for describing a method for uploading a file according to the second embodiment of the present invention

FIG. 5 is a flowchart illustrating a method for uploading a file according to the second embodiment of the present invention. In the flowchart illustrated below, the method has been described by dividing the method into a plurality of steps, but at least some of the steps may be performed in a different order, performed in combination with other steps, omitted, performed by dividing the steps into sub-steps, or may be performed by being added with one or more steps (not illustrated).

First, the client 202 generates an upload request message including the upload target file and transmits the upload request message to the proxy server 107 (S102).

Next, the proxy server 207 divides the upload target file into a plurality of chunks, generates an upload link for each of the plurality of divided chunks, and uploads each of the plurality of chunks to the cloud storage 210 according to the upload link (S104). In this case, the proxy server 207 may simultaneously upload each of the plurality of chunks to the cloud storage 210 according to the upload link.

Next, the proxy server 207 receives an upload confirmation message for each of the plurality of chunks from the cloud storage 210 (S106).

Next, the proxy server 207 extracts the metadata of the upload target file (S108).

Next, the proxy server 207 transmits an upload completion message including the upload link and the metadata for each of the plurality of chunks to the backend server 208 so that the cloud worker 212 can perform post-processing of the upload target file (S110).

Next, the backend server 208 requests a task for post-processing of the upload target file to the client work 112 (S112). In this case, the request for the task may include the upload completion message.

Next, the backend server 208 transmits a confirmation message for the upload completion message to the proxy server 207 (S114).

Next, the proxy server 207 transmits a response message to the upload request message to the client 202 (S116).

Next, the cloud worker 212 requests the upload target file to the cloud storage 210 (S118). The cloud worker 212 may request the upload target file to the cloud storage 210 by referring to the upload link for each chunk and metadata of the upload target file included in the task request received in step S112.

Next, the cloud worker 212 obtains an upload target file from the cloud storage 210 (S120).

Next, the cloud worker 212 performs the post-processing on the upload target file (S122). In this case, the cloud worker 212 already has metadata about the upload target file before performing the post-processing, and thus can perform the post-processing more quickly. The post-processing may include, for example, generating an icon for the upload target file, generating a preview of the upload target file, generating a thumbnail for the upload target file, transcoding of the upload target file, face recognition included in the upload target file, etc.

Finally, the cloud worker 212 uploads the icon, preview, etc. generated through the post-processing to the cloud storage 210 (S124).

As such, according to the second embodiment of the present invention, when comparing to the first embodiment discussed above, due to the fact that the upload of the upload target file is started by the client 202 delivering only one HTTP request (i.e., the upload request in step S102) to the proxy server 207 to start the upload of the upload target file instead of requesting an upload link for each divided chunk to the backend server 208 and receiving the response message from the backend server 208, a transaction over the network 204 having a relatively slow communication speed can be minimized and the upload speed can be improved accordingly.

According to the second embodiment of the present invention, by the proxy server 207 simultaneously uploading each chunk of the upload target file to the cloud storage 210 through the cloud computing environment 206, the upload speed can be significantly improved compared to when the client uploads each chunk to the cloud storage 210 over the network 204 such as the Internet, Wi-Fi network, etc.

In addition, according to the second embodiment of the present invention, the proxy server 207 divides the upload target file into a plurality of chunks and directly generates an upload link for each divided chunk, and thus even if an error occurs during the upload process, upload delay due to an error caused by a network interruption can be minimized by re-uploading only the chunk in which the error has occurred.

Furthermore, according to the second embodiment of the present invention, the metadata of the upload target file is extracted by the proxy server 207 and delivered to the cloud worker 212 through the backend server 208, and thus the client 202 can receive a response message to the upload request message from the proxy server 207 more quickly after the metadata is extracted and accordingly, can request an upload of a new file to the proxy server 207 without having to wait until the post-processing of the upload target file is completed.

Figure 6:
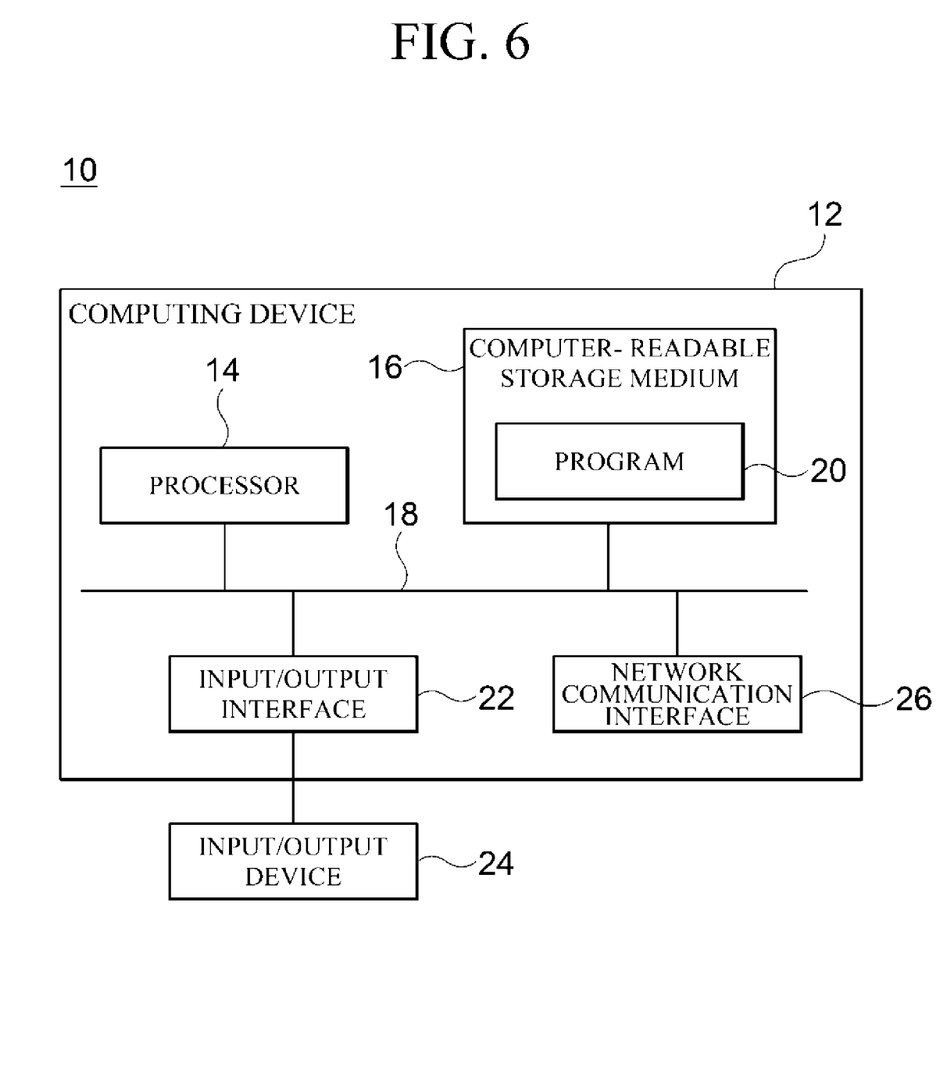
FIG. 6 is a block diagram illustratively describing a computing environment including a computing device suitable for use in exemplary embodiments.

FIG. 6 is a block diagram illustratively describing a computing environment including a computing device suitable for use in exemplary embodiments. In the illustrated embodiment, each component may have different functions and capabilities in addition to those described below, and additional components may be included in addition to those described below.

The illustrated computing environment 10 includes a computing device 12. In an embodiment, the computing device 12 may be the file upload system 100, 200, or one or more components included in file upload system 100, 200.

The computing device 12 includes at least one processor 14, a computer-readable storage medium 16, and a communication bus 18. The processor 14 may cause the computing device 12 to operate according to the exemplary embodiment described above. For example, the processor 14 can execute one or more programs stored on the computer-readable storage medium 16. The one or more programs may include one or more computer-executable instructions, which, when executed by the processor 14, may be configured to cause the computing device 12 to perform operations according to the exemplary embodiment.

The computer-readable storage medium 16 is configured to store the computer-executable instruction or program code, program data, and/or other suitable forms of information. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

Although the present invention has been described in detail through representative examples above, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

What is claimed is:

1. A proxy server that is connected to a client over a network and is respectively connected to a cloud storage, a backend server, and a cloud worker via a cloud computing environment having a faster communication speed than the network, the proxy server comprising:
    a file receiving unit that receives an upload request message including an upload target file from the client;
    a file processing unit that divides the upload target file into a plurality of chunks, generates an upload link for each of the plurality of divided chunks, and uploads each of the plurality of chunks to the cloud storage according to the upload link;
    a metadata extraction unit that extracts metadata of the upload target file; and
    an upload completion processing unit that delivers an upload completion message including the upload link for each of the plurality of chunks and the metadata to the cloud worker through the backend server so that the cloud worker performs post-processing of the upload target file and transmits a response message to the upload request message to the client upon receiving a confirmation message for the upload completion message from the backend server,
    wherein the response message to the upload request message is transmitted to the client after the metadata is extracted by the metadata extraction unit,
    wherein the file receiving unit, after the response message to the upload request message is transmitted to the client, receives an upload request message for a new file from the client without having to wait until post-processing of the upload target file is completed, and
    wherein the post-processing of the upload target file is performed by obtaining the upload target file from the cloud storage using the upload link and the metadata by the cloud worker.

2. The proxy server of claim 1, wherein the file processing unit simultaneously uploads each of the plurality of chunks to the cloud storage according to the upload link, and when an error occurs during an upload process for each of the plurality of chunks, re uploads only the chunk in which the error has occurred.

3. The proxy server of claim 1, wherein the post-processing of the upload target file includes one or more of generating an icon for the upload target file, generating a preview of the upload target file, generating a thumbnail for the upload target file, transcoding of the upload target file, and face recognition included in the upload target file.

4. A method for uploading a file performed by a proxy server that is connected to a client over a network and is respectively connected to a cloud storage, a backend server, and a cloud worker via a cloud computing environment having a faster communication speed than the network, the method comprising:
    receiving, by a file receiving unit, an upload request message including an upload target file from the client;
    dividing, by a file processing unit, the upload target file into a plurality of chunks;
    generating, by the file processing unit, an upload link for each of the plurality of divided chunks;
    uploading, by the file processing unit, each of the plurality of chunks to the cloud storage according to the upload link;
    extracting, by a metadata extraction unit, metadata of the upload target file;
    delivering, by an upload completion processing unit, an upload completion message including the upload link for each of the plurality of chunks and the metadata to the cloud worker through the backend server so that the cloud worker performs post-processing of the upload target file; and
    transmitting, by the upload completion processing unit, a response message to the upload request message to the client upon receiving a confirmation message for the upload completion message from the backend server,
    wherein the response message to the upload request message is transmitted to the client after the metadata is extracted by the metadata extraction unit,
    wherein after the transmitting the response message to the upload request message to the client, an upload request message for a new file is received from the client by the file receiving unit without having to wait until the post-processing of the upload target file is completed, and
    wherein the post-processing of the upload target file is performed by obtaining the upload target file from the cloud storage using the upload link and the metadata by the cloud worker.

5. The method of claim 4, wherein in the uploading each of the plurality of chunks to the cloud storage, each of the plurality of chunks is simultaneously uploaded to the cloud storage according to the upload link, and when an error occurs during an uploading process for each of the plurality of chunks, only the chunk in which the error has occurred is uploaded.

6. The method of claim 4, wherein the post-processing of the upload target file includes one or more of generating an icon for the upload target file, generating a preview of the upload target file, generating a thumbnail for the upload target file, transcoding of the upload target file, and face recognition included in the upload target file.

* * * * *